United States Patent
Lee

(10) Patent No.: US 6,362,593 B1
(45) Date of Patent: Mar. 26, 2002

(54) APPARATUS AND METHOD FOR COMPENSATING DEAD TIME OF MOTOR

(75) Inventor: Sang-hoon Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/754,085

(22) Filed: Jan. 5, 2001

(51) Int. Cl.⁷ .............................................. H02M 7/538
(52) U.S. Cl. ..................... 318/801; 318/439; 318/722
(58) Field of Search .................................. 318/138, 254, 318/439, 445, 452, 484, 722, 801; 388/921; 363/16, 17, 55, 56, 58, 95, 120

(56) References Cited

U.S. PATENT DOCUMENTS

| | | | |
|---|---|---|---|
| 4,751,447 A | 6/1988 | Okachi ........................ | 318/772 |
| 5,475,293 A | * 12/1995 | Sakai et al. .................. | 318/802 |
| 5,625,264 A | * 4/1997 | Yoon ............................ | 318/254 |
| 5,867,380 A | 2/1999 | Lee .............................. | 363/98 |
| 5,952,810 A | * 9/1999 | Yamada et al. ............. | 318/700 |
| 5,977,737 A | 11/1999 | Labriola, II ................. | 318/599 |

FOREIGN PATENT DOCUMENTS

| | | |
|---|---|---|
| JP | 9-47027 | 2/1997 |
| JP | 9-47029 | 2/1997 |
| JP | 9-47064 | 2/1997 |
| JP | 9-84363 | 3/1997 |
| JP | 11-27951 | 1/1999 |
| KR | 10-0219851 | 6/1999 |
| KR | 1999-0061524 | 7/1999 |
| KR | 2000-0025135 | 5/2000 |

* cited by examiner

*Primary Examiner*—Bentsu Ro
(74) *Attorney, Agent, or Firm*—Staas & Halsey LLP

(57) ABSTRACT

Disclosed is a method of compensating a dead time of a motor driving device comprising a current command generating unit generating a current command according to a predetermined algorithm, and a current controller generating a voltage command based on the current command, comprising the steps of measuring the voltage command while changing the current command; estimating a stator resistance value of the motor from the measured voltage command value; and compensating the dead time based on the estimated stator resistance value (R). Through these steps, since the effect due to the non-linearity of the switching devices is correctly compensated, the motor can be controlled more correctly with a low-speed.

7 Claims, 7 Drawing Sheets

Period of dead time

Period of dead time

APPARATUS AND METHOD FOR COMPENSATING DEAD TIME OF MOTOR

FIELD OF INVENTION

The present invention relates in general to apparatuses and methods for compensating dead time of switching elements which are used in servo motors or inverters for driving motors, and more particularly, to an apparatus and a method for compensating a dead time of a motor driving controller comprising a current command generating unit generating a current command according to a predetermined algorithm, and a current controller generating a voltage command based on the current command.

DESCRIPTION OF RELATED ART

Conventionally, if an over-rated current flows into a switching transistor for driving a motor, the switching transistor is damaged. If a pair of switching transistors are on simultaneously, an over-rated current flows into current passages of the two devices. To prevent this flowing, dead time for turning off both of the switching transistors is applied. During the dead time thereof, the current normally flows into a diode by a back electromotive force (EMF) from the motor.

Referring to FIG. 1 which is a driving circuit diagram of a motor having a conventional dead time compensating unit, a conventional motor driving circuit is composed of a motor 3, a converter 1 rectifying an alternating current (AC) power into a direct current (DC) power, an inverter 2 converting the DC power from the converter 1 into a signal and supplying the signal to the motor 3, a current sensor sensing a current applied to the motor 3, a controller 6 having a dead time compensating unit 6a and generating a voltage command based on the current value sensed by the current sensor 5, and a pulse width modulator (hereinafter, "PWM") 7 executing a modulation of a pulse width based on the voltage command from the controller 6 and supplying a control signal to the inverter 2.

With this configuration, the converter 1 rectifies a three-phase AC power through six (6) rectifying diodes ($D_1$) and smoothes it through a smoothing condenser ($C_1$) connected in parallel with the rectifying diodes ($D_1$).

The current sensor 5 senses the current supplied to the motor 3 and supplies the sensed current value to the controller 6. Based on the supplied current value, the controller generates a three-phase voltage command signal (V*). The PWM 7 executes the pulse width modulation based on the voltage command signal (V*) to generate the control signal, and supplies the generated control signal to each gate of the switching devices ($T_1$, $T_2$) of the inverter 2.

The inverter 2 switches the DC voltage applied to each gate of the switching devices ($T_1$, $T_2$) in response to the control signal supplied from the PWM 7, and supplies the switched DC voltage to the motor 3. In the switching devices ($T_1$, $T_2$), diodes ($D_1$, $D_2$) are connected in parallel, to prevent damage thereof by the back EMF from the motor 3.

FIGS. 2a and 2b shows operations of the switching devices ($T_1$, $T_2$) according to directions of the current and flowing of the current, wherein the current value when the current flows into the motor 3 from the inverter 2 is indicated positive (+), and the current value when the current flows into the inverter 2 from the motor 3 is indicated negative (−). While the motor is in dead time, the current flows through the diodes ($D_1$, $D_2$) even if the pair of switching devices ($T_1$, $T_2$) are both off. As shown therein, where the current value is positive, the current flows as if $T_2$ is on. Where the current value is negative, the current flows as if $T_1$ is on.

If the current sensor 5 senses the current applied to the motor 3, the controller 6 determines a polarity of the sensed current value. Where the sensed current value is positive, the controller 6 adds a positive value of voltage compensation as predetermined to the voltage command through the dead time compensating unit 6a. Where the sensed current value is negative, the controller 6 adds a negative value of voltage compensation as predetermined to the voltage command. With these additions, the motor can obtain an effect that there is no dead time.

However, according to the conventional dead time compensating apparatus and method, where the current value is small, a problem occurs at a region where the current value is changed from positive to negative or vise versa, passing through zero point: the range of error due to a non-linearity of the switching devices is magnified, and this results in increasing the difference between the voltage command and the actually applied current and a distortion of current waveforms, thereby increasing heat and noise of the motor.

SUMMARY OF THE INVENTION

Accordingly, the present invention has been made keeping in mind the above-described problem, and an object of the present invention is to provide an apparatus and a method for compensating a dead time of a motor, fully considering features of switching devices such as voltage drop due to the switching devices.

This and other objects of the present invention may be achieved by a provision of a method of compensating a dead time of a motor driving device comprising a current command generating unit generating a current command according to a predetermined algorithm, and a current controller generating a voltage command based on the current command, comprising the steps of measuring the voltage command while changing the current command; estimating a stator resistance value of the motor from the measured voltage command value; and compensating the dead time based on the estimated stator resistance value (R).

In the estimating step, a change rate of the voltage command relative to the current command is estimated as the stator resistance value.

Preferably, the compensating step is comprised of the substeps of obtaining a voltage compensation amount by multiplying the estimated stator resistance value by the current command and subtracting the resulting value from the measured voltage command; storing the obtained voltage compensation amount; and generating a voltage command, by subtracting the corresponding voltage compensation amount from the voltage command.

According to another aspect of the present invention, this and other objects may also be achieved by a provision of an apparatus for compensating a dead time of a motor, comprising a current command supplying unit supplying a current command having a variety of values to the motor; a current controller generating a voltage command based on the current command; a voltage command measuring unit measuring the voltage command; a stator resistance estimating unit estimating a stator resistance based on the measured voltage command; and a voltage compensation amount estimating unit estimating a voltage compensation amount to compensate the dead time, based on the estimated stator resistance.

Preferably, the stator resistance estimating unit estimates a change rate of the voltage command relative to the current command as the stator resistance.

Desirably, the voltage compensation amount estimating unit obtains the voltage compensation amount by multiplying the estimated stator resistance value by the current command and subtracting the resulting value from the measured voltage command.

Still preferably, the voltage command measuring unit is comprised of a moving average filter.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENTS

Figure 1:
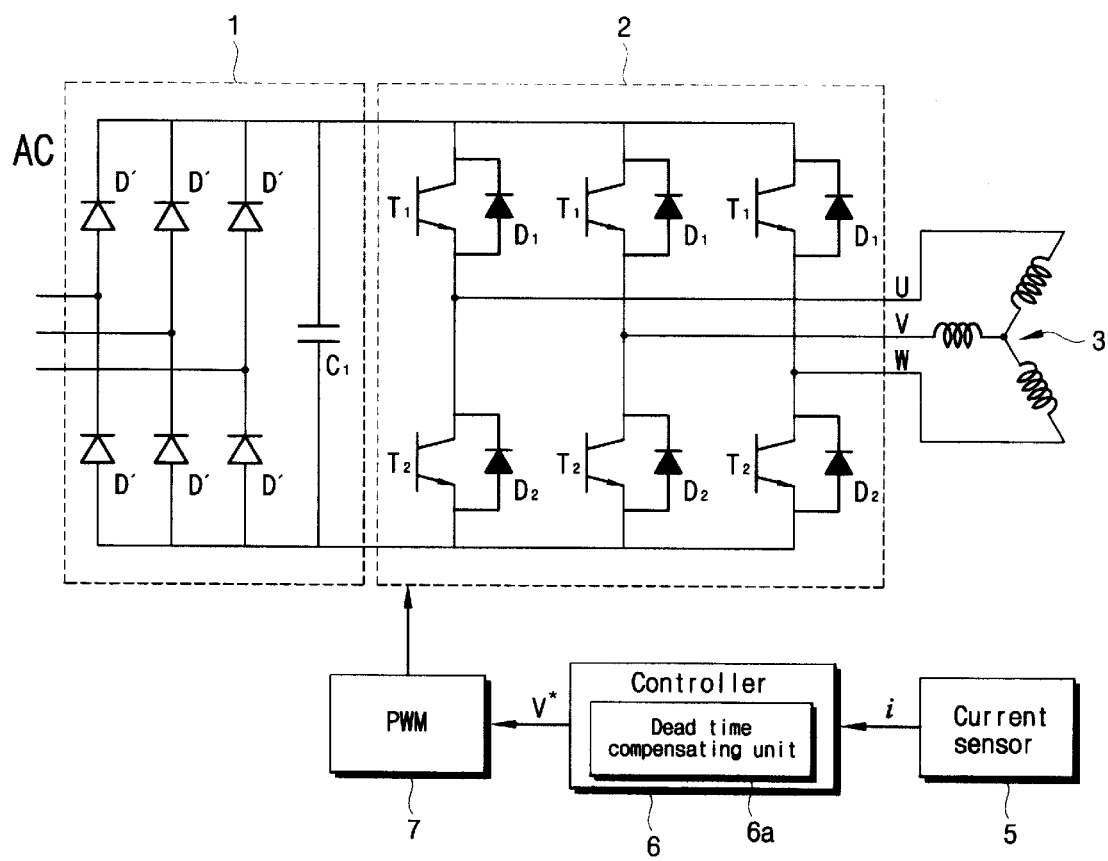
FIG. 1 is a driving circuit diagram of a motor comprising a conventional dead time compensating unit.
Figure 2A:
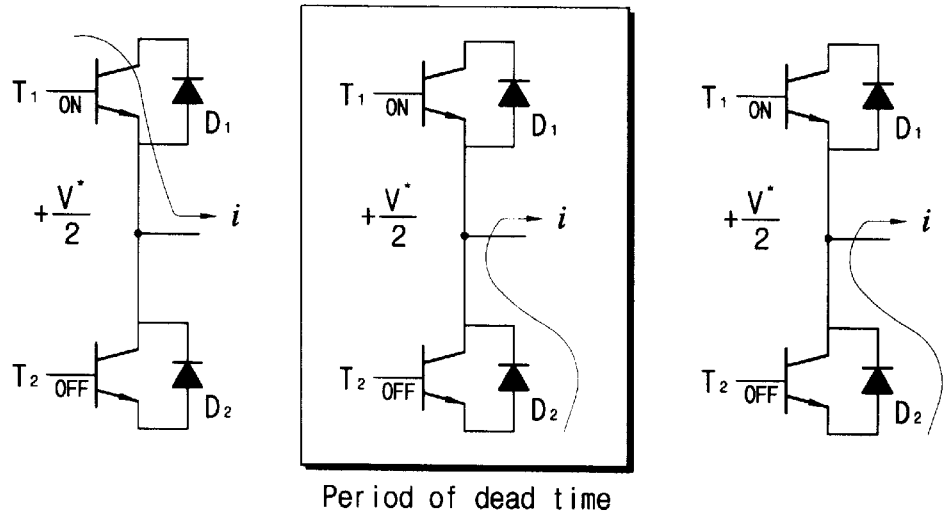
FIGS. 2a and 2b are a schematic view showing an operation according to directions of current and a flow of switching devices ($T_1$, $T_2$)
Figure 2B:
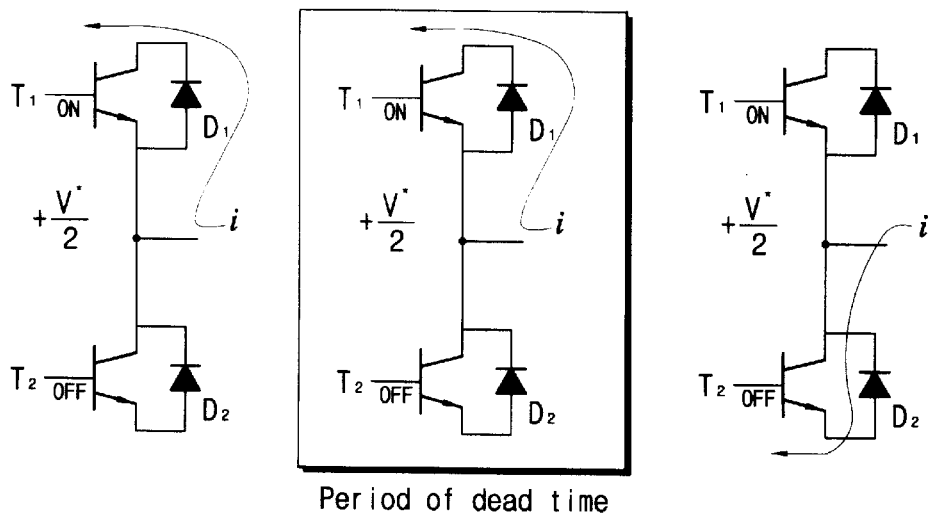
Figure 3:
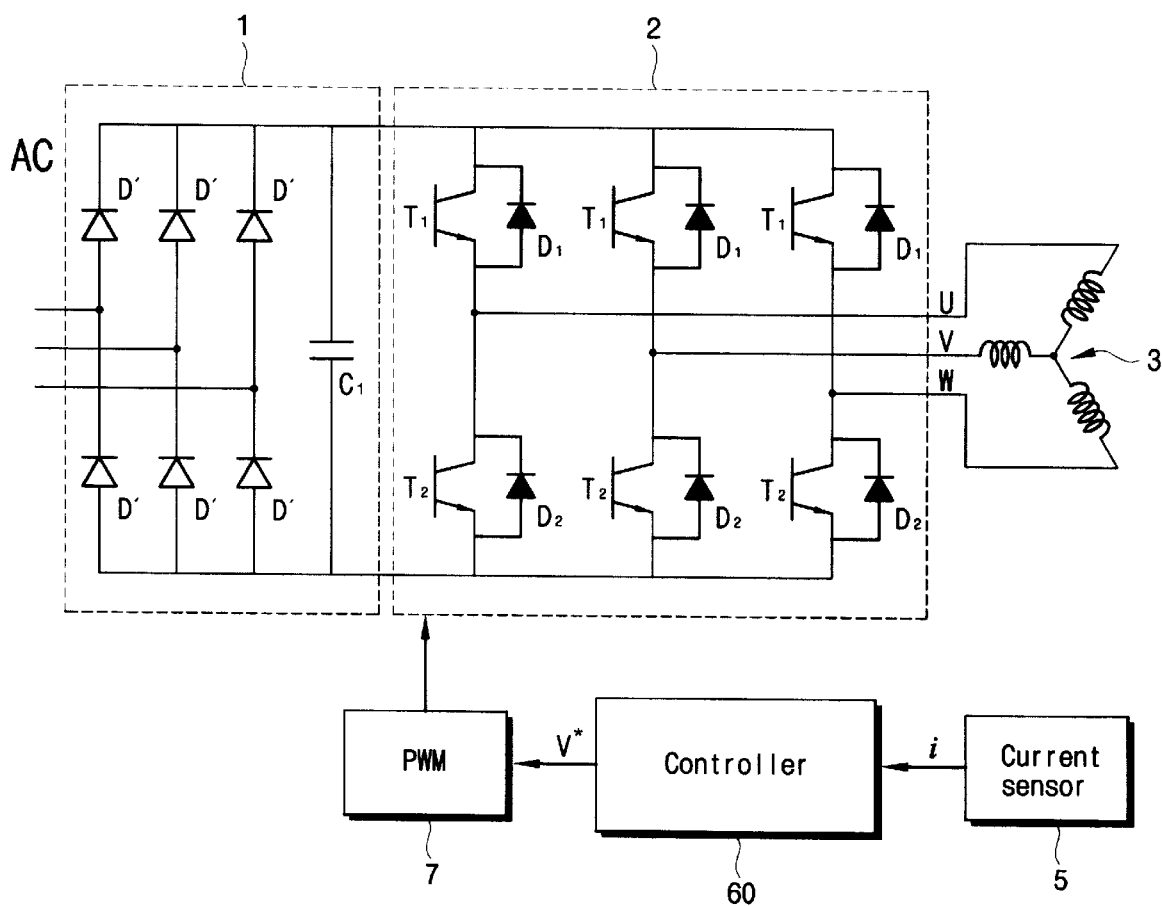
FIG. 3 is a driving circuit diagram of a motor comprising a dead time compensating unit according to the present invention.

Referring to FIG. 3, in a motor driving device comprising a dead time compensating unit according to the present invention, the same elements as those of the conventional motor driving device described above are given the same reference numerals, and therefore, the description thereof will be incorporated.

Figure 4:
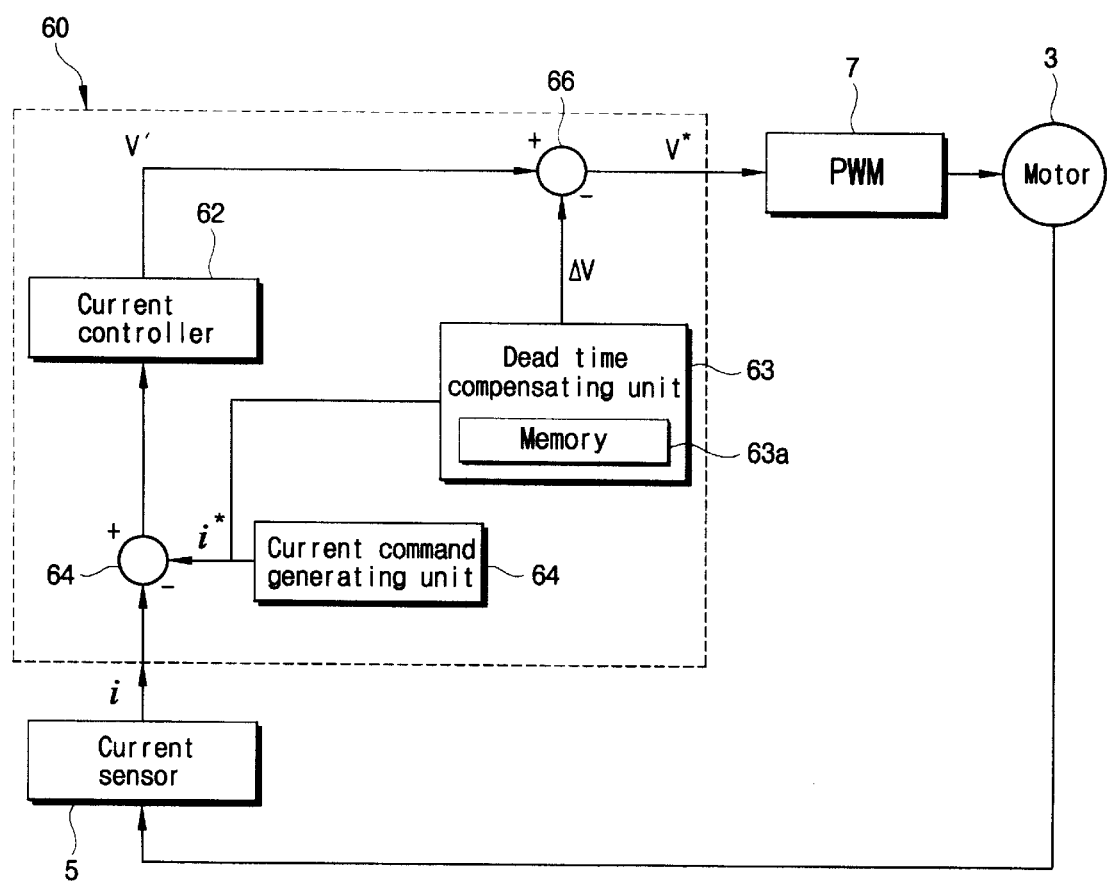
FIG. 4 is a partial detailed view of FIG. 3.

A controller 60 generates a voltage command (V*) based on a current value sensed by a current sensor 5 which is applied to a motor 3 and supplies the generated voltage command (V*) to a PWM 7, differently from the conventional motor driving device. With reference to FIG. 4, the controller 60 is comprised of a current command generating unit 61 generating a current command according to a predetermined algorithm, a first subtracting unit subtracting the current value sensed by the current sensor 5 from the current command value from the current command generating unit 61, a current controller 62 generating a voltage command (V') based on an output from the first subtracting unit 64, a dead time compensating unit 63 for estimating a voltage error ($\Delta V$), and a second subtracting unit 66 subtracting the voltage error ($\Delta V$) from the voltage command (V') and generating the voltage command (V*).

Figure 5:
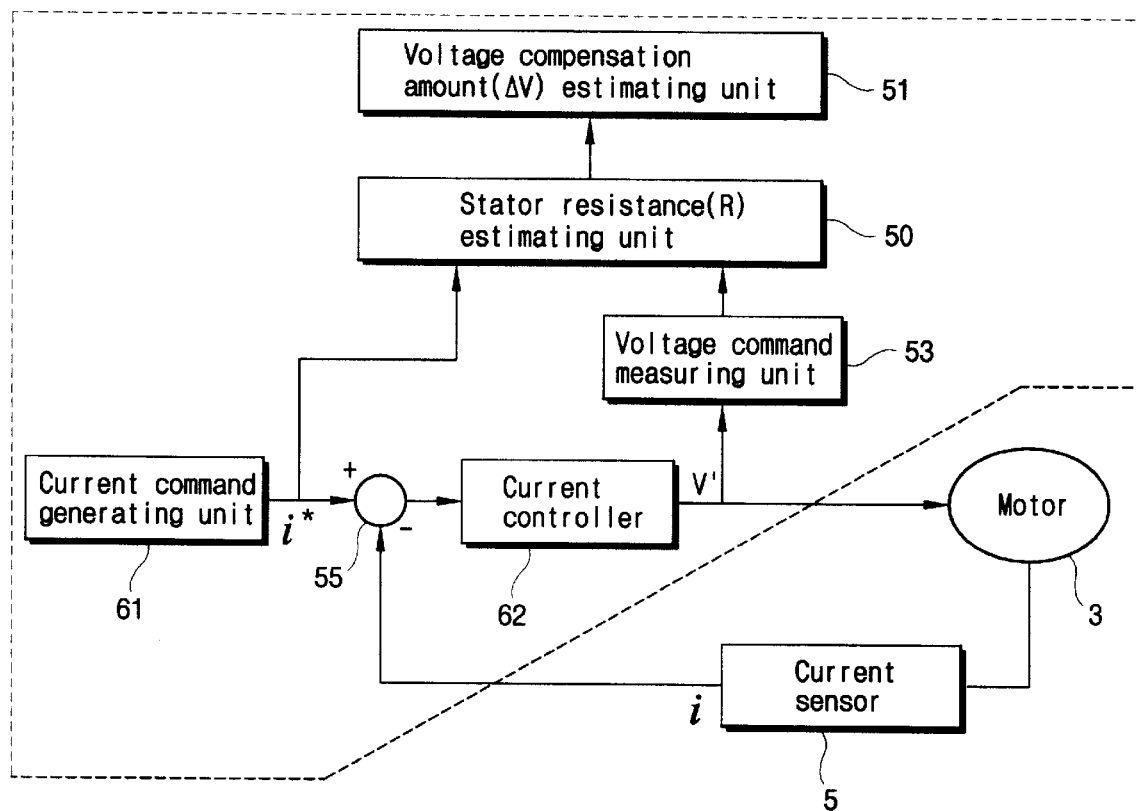
FIG. 5 is a block diagram of a variable estimating unit for a dead time compensation according to the present invention.

Referring to FIG. 5, a variable estimating unit for a dead time compensation is comprised of a current sensor 5 sensing a current applied to the motor 3, a current command generating unit 61 supplying current commands (i*) having various values to the motor 3, a current controller 62 generating a voltage command (V') based on the current command (i*) outputted from the current command generating unit 61 via a subtracting unit 55, a voltage command measuring unit 53 measuring the voltage command (V') from the current controller 62, a stator resistance estimating unit 50 estimating a stator resistance of the motor 3, based on the measured voltage command (V'), and a voltage compensation amount estimating unit 51 estimating a voltage compensation amount ($\Delta V$) for compensating the dead time, based on the estimated stator resistance (R).

The current command generating unit 61, the current controller 62, and the current sensor 5 are of the same as those of the motor driving device of FIG. 4.

Figure 6:
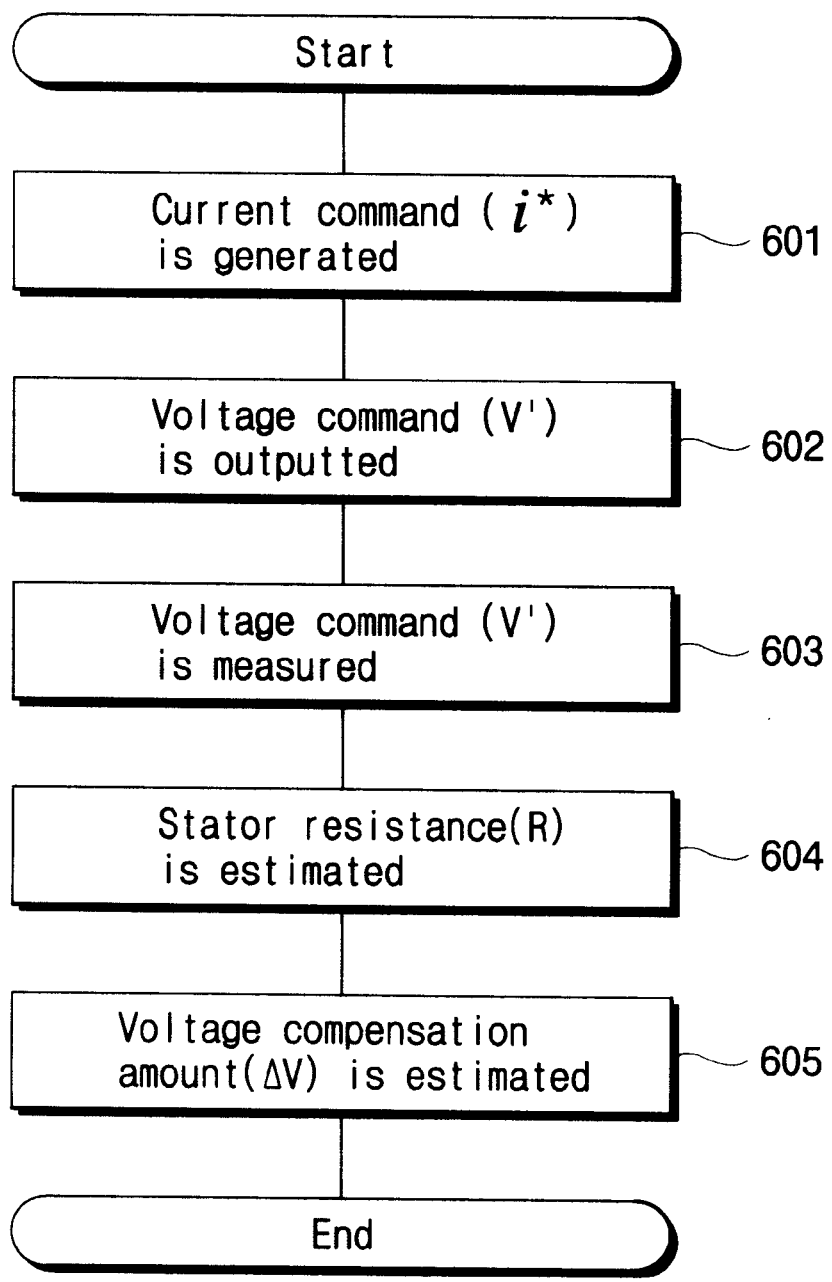
FIG. 6 is a flow chart of a variable estimation for the dead time compensation.

As shown in FIG. 6, the current command generating unit 61 generates a current command (i*) having values between ±30% of a rated current of the motor 3 (601). The current sensor 5 senses a current value (i) from the motor 3 and outputs the sensed current value (i) to the subtracting unit 55, and the subtracting unit 55 subtracts the current value(i) from the current command (i*) and outputs the result to the current controller 62 (602). The current controller 62 outputs a voltage command (V') based on the inputted value (i*–i), and the voltage command measuring unit 53 measures the voltage command (V') from the current controller 62 (603) and stores it in a predetermined memory. The voltage command measuring unit 53 measures the average value by means of a moving average filter so as to decrease an affect from noise which may include when measuring the voltage command. Where the absolute value of the current command is less than a predetermined value (1A in the present embodiment), the current value is measured by increasing the number of measuring steps. This is because the probability of causing an error, due to the non-linearity of the switching devices, is likely to increase if the absolute value of the current is small. But, a specific reference value may be different depending upon characteristics of the motor and driving devices.

Figure 7:
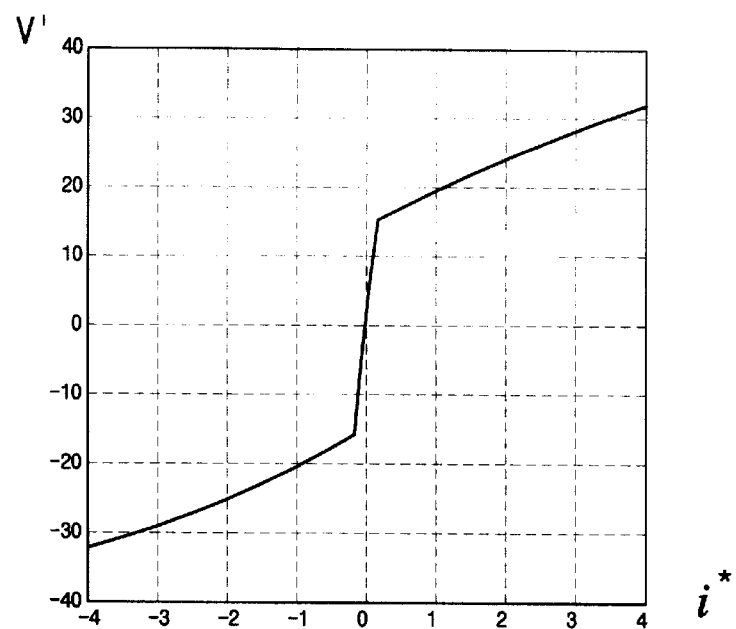
FIG. 7 is a graph showing a relation between a current command (i*) and an estimated voltage command (V')

Referring to FIG. 7, where the absolute value of the current command (i*) is larger than 1A, the graph shows a linearity between the current voltage and the voltage command. Where the absolute value of the current command (i*) is less than 1A, the graph shows a sharp inclination. This shows that the non-linearity of the switching devices largely affects where the absolute value of the current command is small, as described above.

The inclination where the absolute value of the current command (i*) is larger than 1A represents a resistance value of a stator (not shown) of the motor 3 according to the Ohm's law. The stator resistance estimating unit 50 estimates the stator resistance value R of the motor 3 based on the voltage command (V') measured by the voltage command measuring unit 53 and the current command (i*) from the current command generating unit 61 (604). To estimate the stator resistance value R, the stator resistance estimating unit 50 employs a least square method by which a portion of an error from current measurement can be reflected.

The voltage compensation amount estimating unit 51 according to the following mathematical expression, multiplies the estimated stator resistance value R by the current command (i*), and subtracts the resulting value from the measured voltage command (V'), to obtain a voltage compensation amount, that is, the voltage ($\Delta V$) supplied to the motor 3 due to the non-linearity of the switching devices (605):

$$\Delta V = V' - R \times i^*.$$

Figure 8:
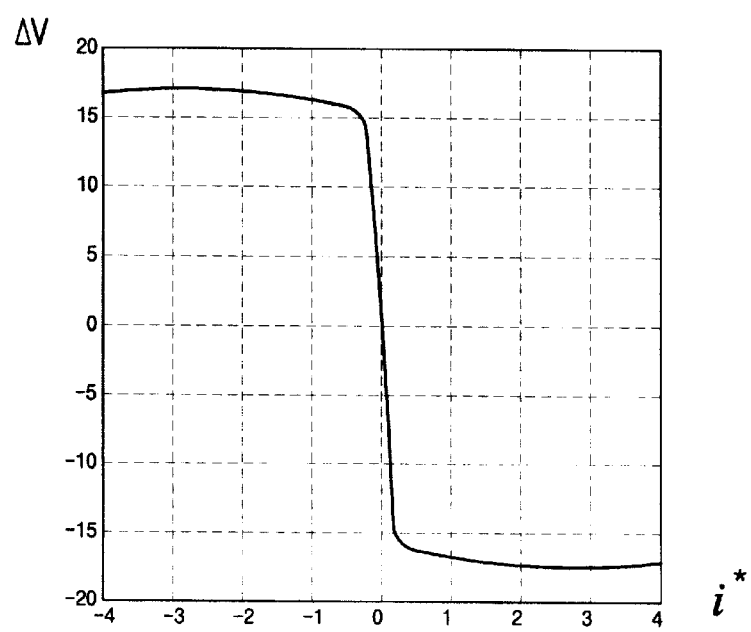
FIG. 8 is a graph showing a relation between a voltage compensation amount and the current command (i*).

Referring to FIG. 8, the voltage compensation amount ($\Delta V$) sharply varies in the section that the absolute value of the current command (i*) is less than 1A, from which it is ascertained that the effect from the non-linearity of the switching devices is enlarged within this section, as described above.

The dead time compensating unit 63 according to the present invention is comprised of a memory 63a storing therein data on the voltage compensation amount (ΔV) of FIG. 8 estimated by the variable estimating unit for the dead time compensation, and supplies the corresponding voltage compensation amount (ΔV) on the basis of the voltage command (V') generated from the current controller 62 to the second subtracting unit 66.

If the current command generating unit 61 generates the current command (i*) according to the predetermined algorithm, the first subtracting unit 64 subtracts the current value sensed by the current sensor 5 which is applied to the motor 3 and supplies the resulting value to the current controller 62. The current controller 62 generates the voltage command (V') based on the supplied current value (i*−i).

The dead time compensating unit 63 receives the current command (i*) outputted from the current command generating unit 61, and outputs the corresponding voltage compensation amount (ΔV) stored in the memory 63a to the second subtracting unit 66. The second subtracting unit 66 outputs to the PWM 7 the voltage command (V*) having a value from which the effect of the non-linearity of the switching devices is removed, after subtracting the voltage compensation amount (ΔV) from the voltage command (V') supplied from the current controller 62. Therefore, the control signal modified by the PWM 7 and supplied to gates of the switching devices has a value free of the non-linearity of the switching devices ($T_1$, $T_2$), and as a result, the deviation of the voltage actually supplied to the motor and the voltage command (V*) becomes insignificant.

Since the effect due to the non-linearity of the switching devices can be correctly compensated even in the range that the absolute value of the current command (i*) is less than 1A, the motor can be controlled more correctly with a low-speed. In other words, the voltage command (V*) can be correctly supplied to the motor, whereby the current supplied to the motor can be precisely controlled, thereby conspicuously decreasing the noise and heat from the motor.

The method of estimating a stator resistance by the variable estimating unit for compensating the dead time, to embody the above-described dead time compensating unit, can be used to a variety of algorithms for controlling the motor with a high-performance, thereby improving performance of the driving systems.

In other words, due to the non-linearity of the switching devices, the stator resistance value of the motor in view of an inverter or a servo driver is larger than the actual stator resistance value of the motor. However, the actual stator resistance value of the motor free of the non-linearity of the switching devices can be obtained, according to the stator resistance estimating method.

As described above, since the effect due to the non-linearity of the switching devices can be correctly compensated even in the case that the absolute value of the current command is small, the motor can be controller more correctly with a low-speed. In other words, the voltage command can be correctly supplied to the motor, whereby the current supplied to the motor can be precisely controlled, thereby conspicuously decreasing the noise and heat from the motor.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method of compensating a dead time of a motor driving device comprising a current command generating unit generating a current command according to a predetermined algorithm, and a current controller generating a voltage command based on the current command, comprising the steps of:

measuring the voltage command while changing the current command;

estimating a stator resistance value of the motor from the measured voltage command value; and compensating the dead time based on the estimated stator resistance value (R).

2. The method according to claim 1, wherein in the estimating step, a change rate of the voltage command relative to the current command is estimated as the stator resistance value.

3. The method according to claim 1, wherein the compensating step is comprised of the substeps of:

obtaining a voltage compensation amount by multiplying the estimated stator resistance value by the current command and subtracting the resulting value from the measured voltage command;

storing the obtained voltage compensation amount; and generating a voltage command, by subtracting the corresponding voltage compensation amount from the voltage command.

4. An apparatus for compensating a dead time of a motor, comprising:

a current command supplying unit supplying a current command having a variety of values to the motor;

a current controller generating a voltage command based on the current command;

a voltage command measuring unit measuring the voltage command;

a stator resistance estimating unit estimating a stator resistance based on the measured voltage command; and a voltage compensation amount estimating unit estimating a voltage compensation amount to compensate the dead time, based on the estimated stator resistance.

5. The apparatus according to claim 4, wherein the stator resistance estimating unit estimates a change rate of the voltage command relative to the current command as the stator resistance.

6. The apparatus according to claim 4, wherein the voltage compensation amount estimating unit obtains the voltage compensation amount by multiplying the estimated stator resistance value by the current command and subtracting the resulting value from the measured voltage command.

7. The apparatus according to claim 4, wherein the voltage command measuring unit is comprised of a moving average filter.

* * * * *